United States Patent
Strong

(10) Patent No.: US 9,253,543 B2
(45) Date of Patent: Feb. 2, 2016

(54) REMOTE CONTROL VIDEO MODULATOR

(71) Applicant: EchoStar Technologies L.L.C., Englewood, CO (US)

(72) Inventor: Stephen Strong, Dunwoody, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 368 days.

(21) Appl. No.: 13/867,919

(22) Filed: Apr. 22, 2013

(65) Prior Publication Data

US 2013/0232535 A1     Sep. 5, 2013

Related U.S. Application Data

(62) Division of application No. 12/622,299, filed on Nov. 19, 2009, now Pat. No. 8,429,693.

(51) Int. Cl.
```
H04N 21/63      (2011.01)
H04N 21/2383    (2011.01)
H04N 21/2385    (2011.01)
H04N 21/24      (2011.01)
```

(52) U.S. Cl.
CPC ........... *H04N 21/63* (2013.01); *H04N 21/2383* (2013.01); *H04N 21/2385* (2013.01); *H04N 21/2404* (2013.01)

(58) Field of Classification Search
None
See application file for complete search history.

(56) References Cited

U.S. PATENT DOCUMENTS

| | | | |
|---|---|---|---|
| 5,625,350 A | 4/1997 | Fukatsu et al. | |
| 6,286,142 B1 * | 9/2001 | Ehreth | 725/78 |
| 2002/0105955 A1 | 8/2002 | Roberts, III et al. | |
| 2003/0122966 A1 * | 7/2003 | Markman et al. | 348/563 |
| 2005/0185931 A1 * | 8/2005 | Isozaki et al. | 386/95 |
| 2005/0251821 A1 | 11/2005 | Pina | |
| 2005/0261018 A1 * | 11/2005 | Yamamoto | 455/522 |
| 2006/0236358 A1 * | 10/2006 | Liu et al. | 725/117 |

OTHER PUBLICATIONS

"Ethernet over coax", retrieved from Wikipedia Internet site located at http://en.wikipedia.org/w/index.php?title=Ethernetover coax &printable=yes on Nov. 5, 2009, 3 pages.

"Multimedia over Coax Alliance", retrieved from Wikipedia Internet site located at http://en.wikipedia.org/w/index. php?title=Multimedia over coax Alliance&printable=yes on Nov. 18, 2009, 2 pages.

"Universal Plug and Play", retrieved from Wikipedia internet site located at http://en.wikipedia.org/w/index.php?title=Universal Plug and Play&printable=yes on Nov. 5, 2009, 8 pages.

(Continued)

*Primary Examiner* — Mark D Featherstone
(74) *Attorney, Agent, or Firm* — Lowe Graham Jones PLLC

(57) ABSTRACT

A video modulator is presented. The modulator includes a video input interface, a video modulation circuit, a video output interface, a communication interface, and control circuitry. The video input interface is configured to receive a video signal to be modulated, the video modulation circuit is configured to modulate the video signal, and the video output interface is configured to transmit the modulated video signal. The communication interface is configured to receive a command via a communication link to control the video modulator. The control circuitry is configured to receive the command from the communication interface and to control at least one of the video input interface, the video modulation circuit, and the video output interface based on the command.

18 Claims, 6 Drawing Sheets

(56) References Cited

OTHER PUBLICATIONS

"What's in a SMA TV System?", retrieved from Campus Cable Systems internet site located at http://www.campuscablesystems.com/system.php on Nov. 5, 2009, 3 pages.

"What is SMATV?", retrieved from Campus Cable Systems internet site located at http://www.campuscablesystems.com/whal.php on Nov. 5, 2009, 2 pages.

"Why invest in a SMATV Cable TV System?", retrieved from Campus Cable Systems internet site located at http://www.campuscablesystems.com/why.php on Nov. 5, 2009, 1 page.

* cited by examiner

REMOTE CONTROL VIDEO MODULATOR

PRIORITY CLAIM

This patent application is a Divisional of U.S. Non-Provisional patent application Ser. No. 12/622,299, filed Nov. 19, 2009, and entitled "REMOTE CONTROL VIDEO MODULATOR," issued as U.S. Pat. No. 8,429,693, the content of which is herein incorporated by reference in its entirety.

BACKGROUND

Oftentimes, television viewers living in single-family dwellings or similar accommodations receive audio/video programming by way of individual cable or satellite television receivers, or "set-top boxes", capable of receiving a multitude of channels from an orbiting satellite or cable television head-end. Use of one or more receivers for each dwelling allows each viewer or subscriber significant flexibility in the types and amounts of programming to which the viewer wishes to subscribe.

However, in more dense population environments, such as apartment buildings, hotels, large corporate sites, and college campuses, use of individual receiver units for each potential television subscriber or viewer may be undesirable from the standpoint of space consumption and system complexity for the individual television antennas and/or cable connections that may be required, as well as the costs associated with the initial set-up and maintenance of such a system. As a result, Satellite (or "Small") Master Antenna Television (SMATV) systems are often chosen to service such venues. Generally, an SMATV system may operate as its own private cable company in that only the channels desired by the community to be served will be received and provided thereto, thereby possibly reducing overall subscription costs. In many cases, the system will employ a small group of satellite and/or terrestrial antennas, cable connections, and the like to receive the desired programming. Further, each channel of programming received via the antennas and other sources may be selected or tuned to by a separate television receiver or set-top box. Each of the resulting selected video signals may then be forwarded to a separate audio/video modulator, such as a National Television System Committee (NTSC) modulator, thus allowing the system operator to align the received channels according to a desired channel lineup. The modulated signals may then be combined and distributed across the target site via coaxial cable or other means to individual taps, each of which may be connected to one or more televisions, which may then tune to one of the modulated signals under the control of a user. Typically, the receivers and modulators reside in a small number of equipment racks located in an equipment closet or similar area.

As a result, an SMATV system typically provides a significant number of programming channels to a large number of potential users efficiently and cost-effectively. However, one or more of the system components, such as a video receiver or modulator, may fail occasionally, thus causing the loss of reception of a programming channel. In response to such a failure, maintenance personnel typically are requested to repair or replace the affected component as soon as possible to reduce the time period during which the associated channel is unavailable.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
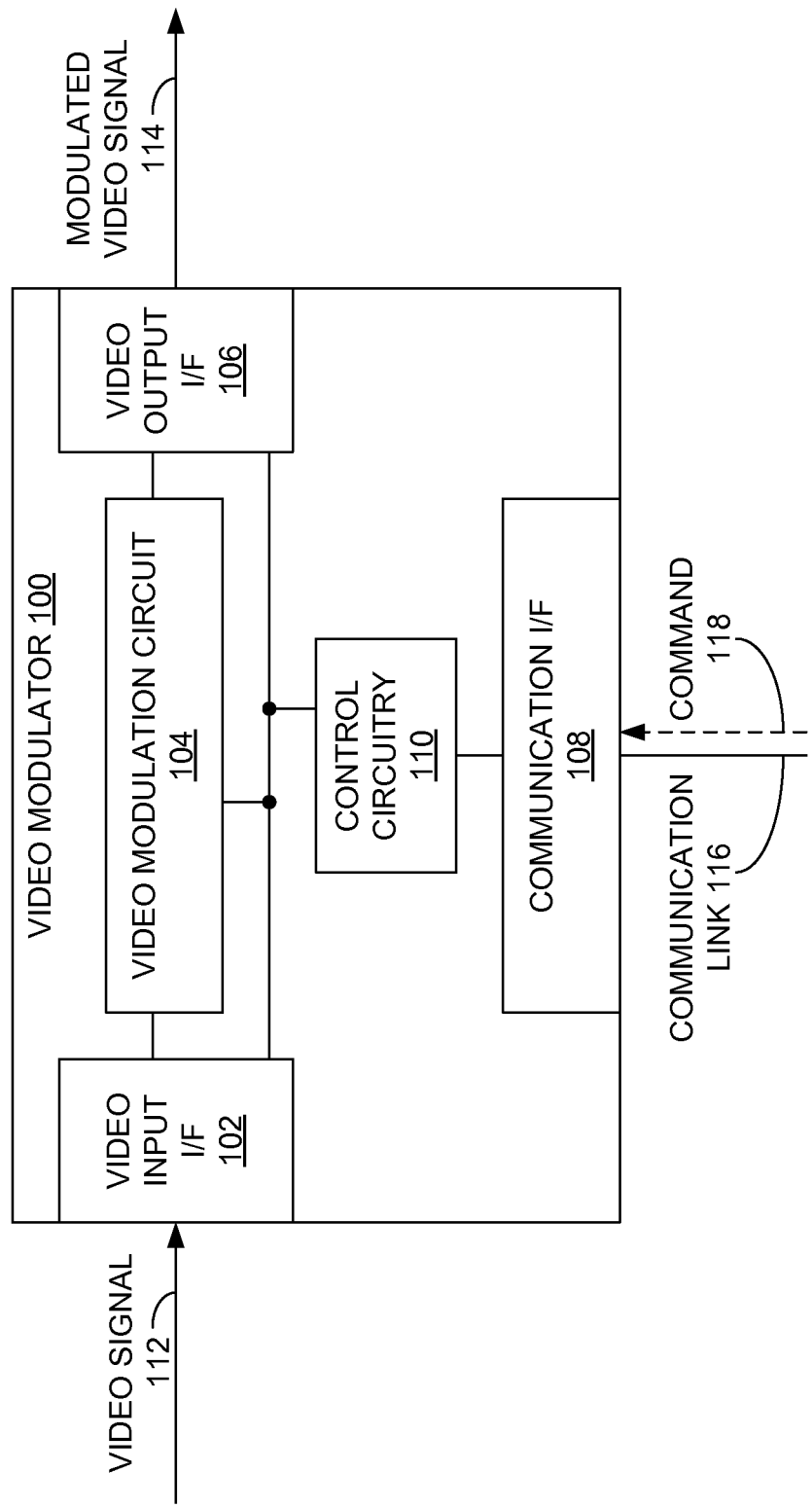
FIG. 1 is a block diagram of a video modulator according to an embodiment of the invention

FIG. 1 is a simplified block diagram of a video modulator 100 according to an embodiment of the invention. In one implementation, the video modulator 100 is a modulator that processes incoming video signals 112 that include video, and possibly associated audio, information. The video modulator 100 includes a video input interface 102, a video modulation circuit 104, a video output interface 106, a communication interface 108, and control circuitry 110. Other circuitry, such as a user interface, power supply, and so on, may also be included in the video modulator 100, but such circuitry is not depicted in FIG. 1 to simplify the following discussion.

The video input interface 102 is configured to receive a video signal 112 to be modulated. In one example, the video signal is an unmodulated video baseband signal, possibly including related audio information. In another example, the video input interface 102 may be adapted to receive other types of video signals, including unmodulated and modulated analog signals, and digital signals, such as those conforming to one of the Moving Picture Experts Group (MPEG) standards, such as MPEG-2 or MPEG-4, or the Advanced Television Systems Committee (ATSC) digital television standards. In the case of the video signal 112 being modulated, the video input interface 102 may be adapted to demodulate such a signal 112. The video signal 112 may carry any kind of video content, such as movies, sporting events, news programs, and the like. Also, the video input interface 102 is configured to receive the video signal 112 from a discrete output device, such as a set-top box or other video receiver device, possibly by way of coaxial cable, composite or component video cable, or other video transmission means.

The video modulation circuit 104 receives the video signal 112 that was received (and possibly processed) by the video input interface 102 and modulates the video signal 112. In one example, the video signal 112 is modulated at a particular frequency that is either fixed, or that is selected by way of the control circuitry 110, thus producing a modulated video signal 114. According to one implementation, the modulation is performed according to the National Television System Committee (NTSC) video standard. In another implementation, the modulation circuit 104 may modulate the modulated video signal 114 according to the Advanced Television Systems Committee (ATSC) standards, or according to some other video modulation format.

The video output interface 106 may transmit the modulated video signal 114 to a destination, such as one or more televisions. This transmission may occur by way of antenna, coaxial cable, or other wired or wireless transmission means. The video output interface 106 may also amplify the modulated video signal 114 as may be required before transmission, depending on the particular environment involved. In one example, the video output interface 106 is configured to transmit the modulated video signal 114 over a video distribution network, such as a coaxial cable network, to multiple video reception devices, such as televisions or video monitors.

The communication interface 108 is configured to receive a command 118 from a communication link 116 to control the video modulator 100. The communication link 116 may be any wired or wireless communication link configured to carry such a command. Examples of the communication link 116 may include a local-area network (LAN) (such as an Ethernet network or connection, or a Wi-Fi connection, such as an interface conforming to one of the IEEE 802.11 standards) and a wide-area network (WAN) (such as the Internet).

The control circuitry 110 is coupled to the video input interface 102, the video modulation circuit 104, the video output interface 106, and the communication interface 108. Generally, the control circuitry 110 is configured to receive the command 118 from the communication interface 108 and to control at least one of the video input interface 102, the video modulation circuit 104, and the video output interface 106 based on the command 118.

The control circuitry 110 may control the various components of the video modulator 100 based on the command 118, depending on the particular embodiment. For example, the command 118 may indicate a frequency at which the video signal 112 is to be modulated. In response, the control circuitry 110 may then instruct the video modulation circuit 104 to modulate the video signal 112 at that frequency. In another implementation, the command 118 may indicate whether transmission of the modulated video signal 114 is to be enabled or disabled. In reply, the control circuitry 110 may force the video output interface 106 to cease or disable transmission of the modulated video signal 114. In another embodiment, the control circuitry 110 may instruct the video modulation circuit 104 to cease modulation of the video signal 112. Similarly, the command 118 may indicate that the video signal 112 input is to be disabled. In response, the control circuitry 110 may disable the video input interface 102. In another example, the command 118 may provide an instruction to alter the signal strength of the modulated video signal 114 being transmitted, to which the control circuitry 110 may respond by controlling the video output interface 106 to alter the modulated video signal 114 signal strength in the indicated manner.

The control circuitry 110 may also receive status data from the video input interface 102, the video modulation circuit 104, and/or the video output interface 106, possibly in response to specific requests from the control circuitry 110. This status may serve as the basis for the commands 118 being received at the communication interface 108.

The control circuitry 110 may include one or more processors, such as a microprocessor, microcontroller, or digital signal processor (DSP), configured to execute instructions directing the processor to perform the functions discussed more fully below. The control circuitry 110 may also include memory or data storage adapted to contain such instructions. In another implementation, the control circuitry 110 may be strictly hardware-based logic, or may include a combination of hardware, firmware, and/or software elements. Further, the control circuitry 110 may communicate with any of the video input interface 102, the video modulation circuit 104, the video output interface 106, and the communication interface 108 by way of a data bus, dedicated input/output signal lines, or other means.

Employing any of various implementations of the video modulator 100 of FIG. 1 thus allows remote control of the video modulator 100 by way of a remote computing device via the communication link 116, unlike current video modulators, which normally provide a physical interface, such as a keypad, to control the modulator, thus requiring the physical presence of an operator to effect any changes in the modulator.

Figure 2:
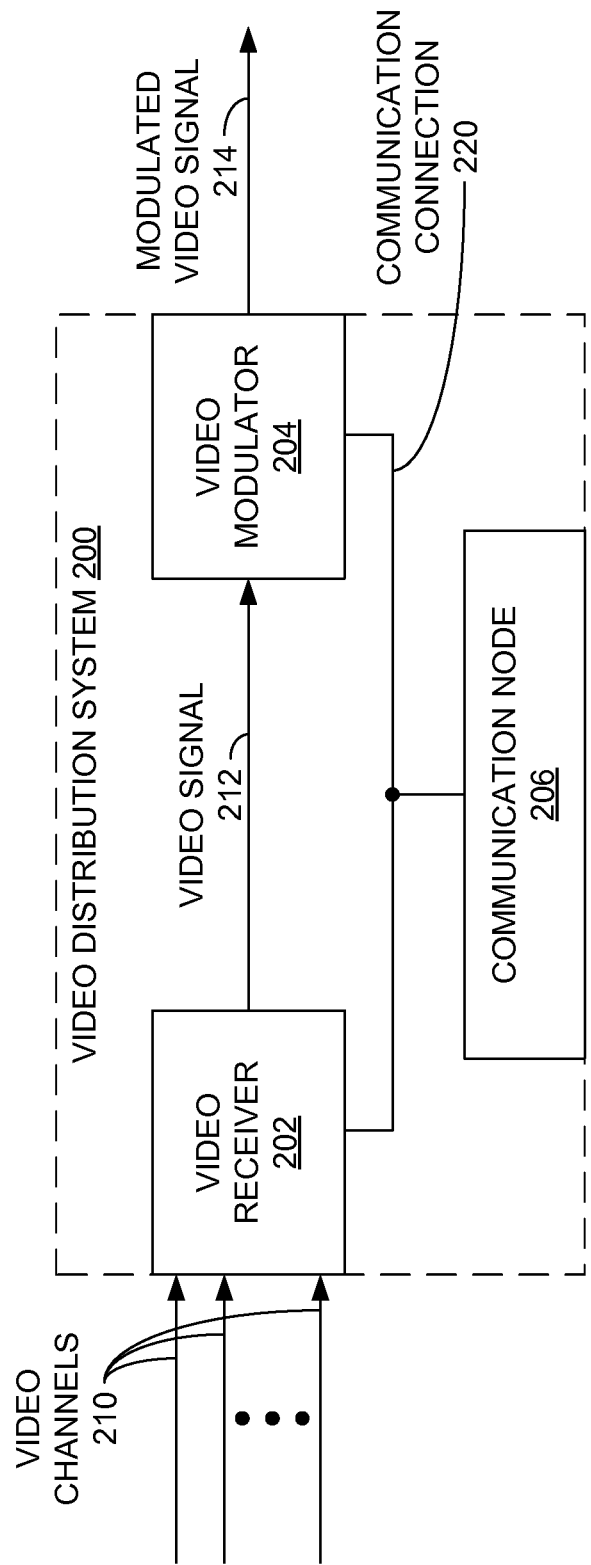
FIG. 2 is a block diagram of a video distribution system employing a video modulator according to an embodiment of the invention.

FIG. 2 depicts a video distribution system 200 including a video receiver 202, a video modulator 204, and a communication node 206 according to one implementation. The video receiver 202 is configured to receive a plurality of video channels 210, with each channel 210 carrying video (or audio/video) content. In one example, the video channels 210 may be modulated according the NTSC standard, the ATSC standard, or some other television signal in analog or digital format. The receiver 202 is also configured to select or tune to one of the channels 210, and to transmit the selected channel 210 to the video modulator 204 as a video signal 212. If the selected video channel 210 signal is modulated, the receiver 202 may demodulate the selected channel 210 to yield a baseband video signal 212 in one embodiment. One example of the video receiver 202 is a terrestrial ("over-the-air"), cable, or satellite television receiver or set-top box, although other types of television receivers or tuners may be employed to similar effect.

An example of the video modulator 204 is the modulator 100 of FIG. 1. In this case, the video modulator 204 is adapted to receive the video signal 212 from the video receiver 202, modulate the video signal 212, and transmit the modulated video signal 214. As discussed above, the modulated video signal 214 may be modulated as an NTSC or ATSC signal for transmission to one or more remotely located televisions over a video distribution network in one arrangement.

The communication node 206 is communicatively coupled to the video receiver 202 and the video modulator 204 by way of a communication connection 220. The connection 220 may be any link that can transfer commands from the node 206 to the receiver 202 and the modulator 204. Such a connection 220 may be a LAN or WAN connection, such as those mentioned above in conjunction with the modulator 100 of FIG. 1. Thus, the communication node 206 controls the receiver 202 and the modulator 204, thus allowing the node 206 to control and coordinate the operation of the receiver 202 and the modulator 204 so that one of the video channels 210 may be selected and processed, resulting in a modulated video signal 214 being transmitted from the video distribution system 200.

Figure 3:
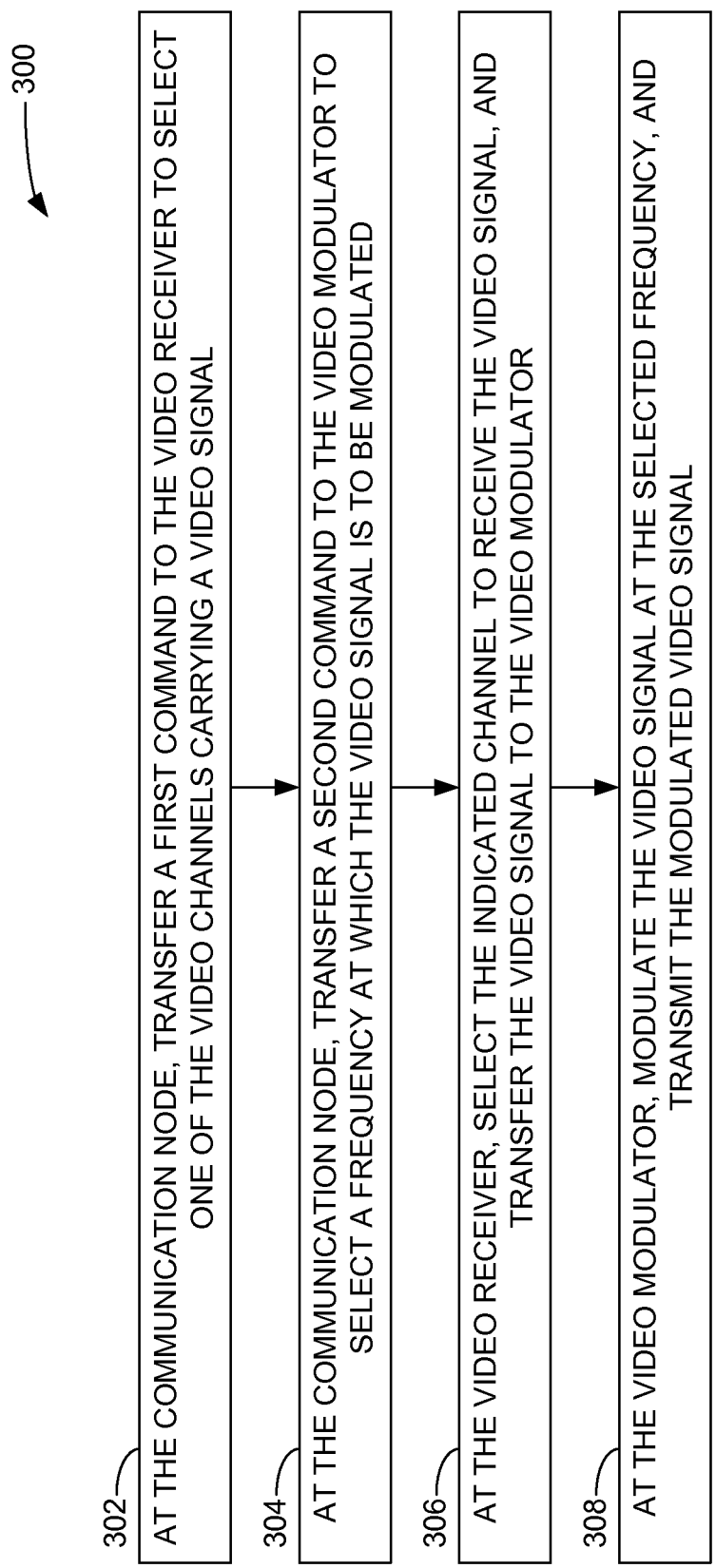
FIG. 3 is a flow diagram of a method of operating a video distribution system according to an embodiment of the invention.

A particular method 300 of operating the video distribution system 200 of FIG. 2 is presented via the flow diagram illustrated in FIG. 3. In the method 300, a first command is transferred from the communication node 206 to the video receiver 202 to select one of the video channels 210 carrying a video signal 212 (operation 302). The communication node 206 also transfers a second command to the video modulator 204 to select a frequency at which the video signal 212 is to be modulated (operation 304). In response to the first command, the video receiver 202 selects the indicated channel 210 to receive the video signal 212 and transfers the video signal 212 to the video modulator 204 (operation 306). The video modulator 204, in response to the second command, receives the video signal 212, modulates the video signal 212 at the selected frequency, and transmits the resulting modulated video signal 214 (operation 308). In one example, the transmission of the modulated video signal 214 is provided over a video signal distribution network to multiple televisions or other video reception devices, such as DVRs, audio/video receivers, and the like. Thus, the communication node 206 controls the video receiver 202 and the video modulator 204 without the direct physical involvement of a human operator.

While the operations of FIG. 3 are depicted as being executed in a particular order, other orders of execution, including concurrent execution of two or more operations, may be possible. In another embodiment, a computer-readable storage medium may have encoded thereon instructions for the video receiver 202, the video modulator 204, and the communication node 206 to implement the method 300.

Figure 4:
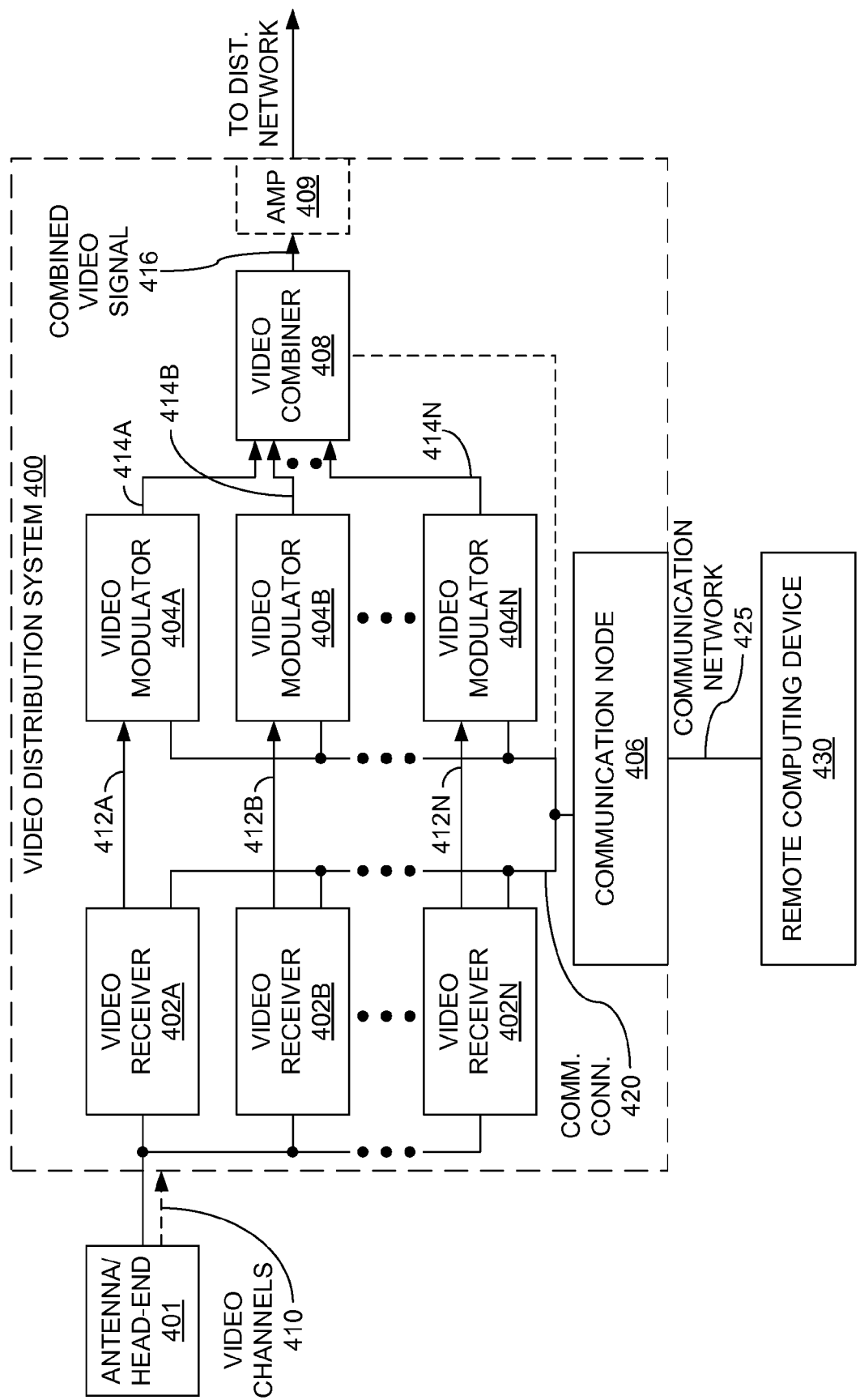
FIG. 4 is a block diagram of a video distribution system according to another embodiment of the invention.

FIG. 4 depicts another video distribution system 400 according to one implementation of the invention. Generally, the system 400 includes a plurality of video receivers 402 (labeled 402A, 402B, . . . , 402N) and a plurality of video modulators 404 (denoted 404A, 404B, . . . , 404N), with each of the receivers 402 coupled with a corresponding one of the modulators 404. In one example, each of the receivers 402 may be configured as the receiver 202 of FIG. 2, while each of the video modulators 404 may be adapted as the modulator 204 of FIG. 2. Coupled to each of the receivers 402 and modulators 404 by way of a communication connection 420 is a communication node 406, such as the node 206 of FIG. 2.

In one example, each of the video receivers 402 is a terrestrial, cable, or satellite television receiver or set-top box coupled to one or more satellite or terrestrial antennas/cable head-ends 401 which collectively provide a number of video channels 410. The video channels 410 may include any video and/or audio content channel, such as news channels, sports channels, national broadcast network channels, local television channels, music-only channels, and others. Further, the video channels 410 may be formatted according to any analog or digital format normally associated with the antenna/head-end 401 sourcing the video channels 410, such as NTSC, ATSC, and the like. Thus, as with the video receiver 202 of FIG. 2, each of the video receivers 402 are configured to select one of the video channels 410 as directed by the communication node 406, demodulate the selected channel 410 to yield a video signal 412 (such as a baseband video signal), and transfer the video signal 402 to the video modulator 404 associated with the video receiver 402.

Typically, the number of receivers 402, as well as the number of modulators 404, is greater than or equal to the number of video channels 410 that are to be provided to a community or area being served by the video distribution system 400. If the number of receivers 402 and modulators 404 is greater than the number of video channels 410, some of the additional receivers 402 and modulators 404 may serve as spare components for replacing any of the other receivers 402 or modulators 404.

While FIG. 4 suggests that the number of receivers 402 and modulators 404 are equal, such an arrangement is not required. Further, some video content may be provided or generated within the video distribution system 400. This video content may include content stored on a storage medium, such as a hard disk drive. Such content generally does not require the use of a video receiver 402, but still employs a video modulator 404 to modulate the video signal generated by the storage medium.

Each video modulator 404 receiving a video signal 412 may modulate the signal 412 according to any useful analog or digital modulation format, include NTSC and ATSC, to allow subsequent transmission of the resulting modulated signal 414 over a distribution network (not explicitly shown in FIG. 4) to individual televisions and other devices located throughout the community or area being serviced.

Generally, each video modulator 404 currently modulating a video signal 412 from a corresponding receiver 402 is configured so that each video signal 412 is modulated at a different frequency to prevent any conflict or interference between the video signals 412. As is described in greater detail below, the communication node 406 may be tasked with ensuring that the modulating frequencies are utilized in such fashion. Further, the communication node 406 may assign the video signals 412 to the modulation frequencies such that the resulting video signals are aligned or grouped in channels received at the televisions coupled to the distribution network according to some logical sequence. For example, local television channels represented by the modulator video signals 414 may be associated with frequencies corresponding to their over-the-air channel frequencies. Further, channels providing similar content, such as sports channels or movie channels, may be grouped together in some logical order.

Each of the resulting modulated video signals 414 may then be transferred from its associated modulator 404 to a video combiner 408, thus combining each of the modulated video signals 414 into a combined video signal 416. Optionally, an amplifier 409 may then be used to amplify the combined video signal 416 before transmitting the signal 416 throughout a community or area by way of a distribution network.

The distribution network may include any means for transporting the combined video signal 416, such as coaxial cable adapted for such a purpose. Depending on the size of the geographical area being serviced, as well as other factors, the distribution network may include a number of splitters, amplifiers, repeaters, and associated components to ensure that the quality of the combined video signal 416 is acceptable at each terminal or tap to which a television or similar device may be connected.

Similar to the communication node 206 of FIG. 2, the communication node 406 employs commands transferred over the communication connection 420 to control each of the video receivers 402 and video modulators 404. In addition to instructing one or more of the receivers 402 as to which of the video channels 410 to select, and directing one or more of the modulators 404 as to which modulation frequency to employ, the communication node 406 may control other aspects of each receiver 402 and modulator 404, as well as other components of the video distribution system 400 and beyond. For example, the communication node 406 may instruct one or more spare or defective receivers 402 or modulators 404 to enter a low-power mode, or to awaken from such a mode. In another implementation, the node 406 may alter or adjust the strength of the modulated video signal 414 produced by each modulator 404 to provide a signal of sufficient quality, as well as to balance the audio and/or video power levels of the modulated video signals 414 with respect to each other to reduce annoying or detrimental differences in those levels at the receiving television. Further, the node 406 may disable one or more signal input or output interfaces of any of the receivers 402 and modulators 404. Other command and control possibilities regarding the receivers 402 and the modulators 404 are also possible in other embodiments.

Aside from the receivers 402 and modulators 404, the communication node 406 may control other components within, or coupled with, the video distribution system 400. In one example, the video combiner 408, and possibly the amplifier 409, may be configured to receive and process commands received from the communication node 406 over the same communication connection 420 or a separate communication path. Such commands may cause certain inputs or outputs to be enabled or disabled, output signal levels to be increased or decreased, or cause other changes within the component receiving the command.

In other embodiments, the communication node 406 may communicate with components, such as amplifiers, repeaters, switches, and splitters, of the distribution network. For example, commands from the node 406 may be forwarded to these particular components by way of coaxial cable extending from the video modulators 404 to the video combiner 408, and throughout the distribution network by way of data transferred over such cabling. Such data may conform to the Multimedia over Coax Alliance (MoCA) standard in one implementation. In one arrangement, the distribution network may provide a level of redundancy such that more than one path through the network may be possible to at least some of the network terminals. As a result, the communication node 406 may issue commands that route the combined video signal 416 over a specific redundant path. Other commands may alter the amount of amplification provided by the amplifiers or repeaters of the network, and may address other functions of the network components of the network.

In addition to carrying commands from the communication node 406 to the receivers 402, modulators 404, and other components of the video distribution system 400 and associated distribution network, the communication connection 420 may carry operational status from those same components to the communication node 406. In one example, such status may be returned at the prompting of the component with which the status is associated, without prompting from the node 406. In other implementations, the communication node 406 may explicitly request or poll each component for its status, which the component returns in response to the request. Other methods by which the components report their response to the node 406 may be employed in other embodiments.

The types of status returned may depend on the component returning the status. Each of the receivers 402, for example, may return status indicating the current selected video channel 410, status indicating whether video signals are present at either of its input or output ports, status quantifying the quality of those signals, and the like. Similarly, each of the video modulators 404 may present status indicating the current modulating frequency for its modulated video signal 414, status indicating whether its input video signal 412 is active, status as to whether its output modulated video signal 414 is active, and status quantifying the strength and/or quality of those signals 412, 414. The video combiner 408, the optional amplifier 409, and other components within and external to the video distribution system 400 may provide similar or corresponding status information.

Figure 6:
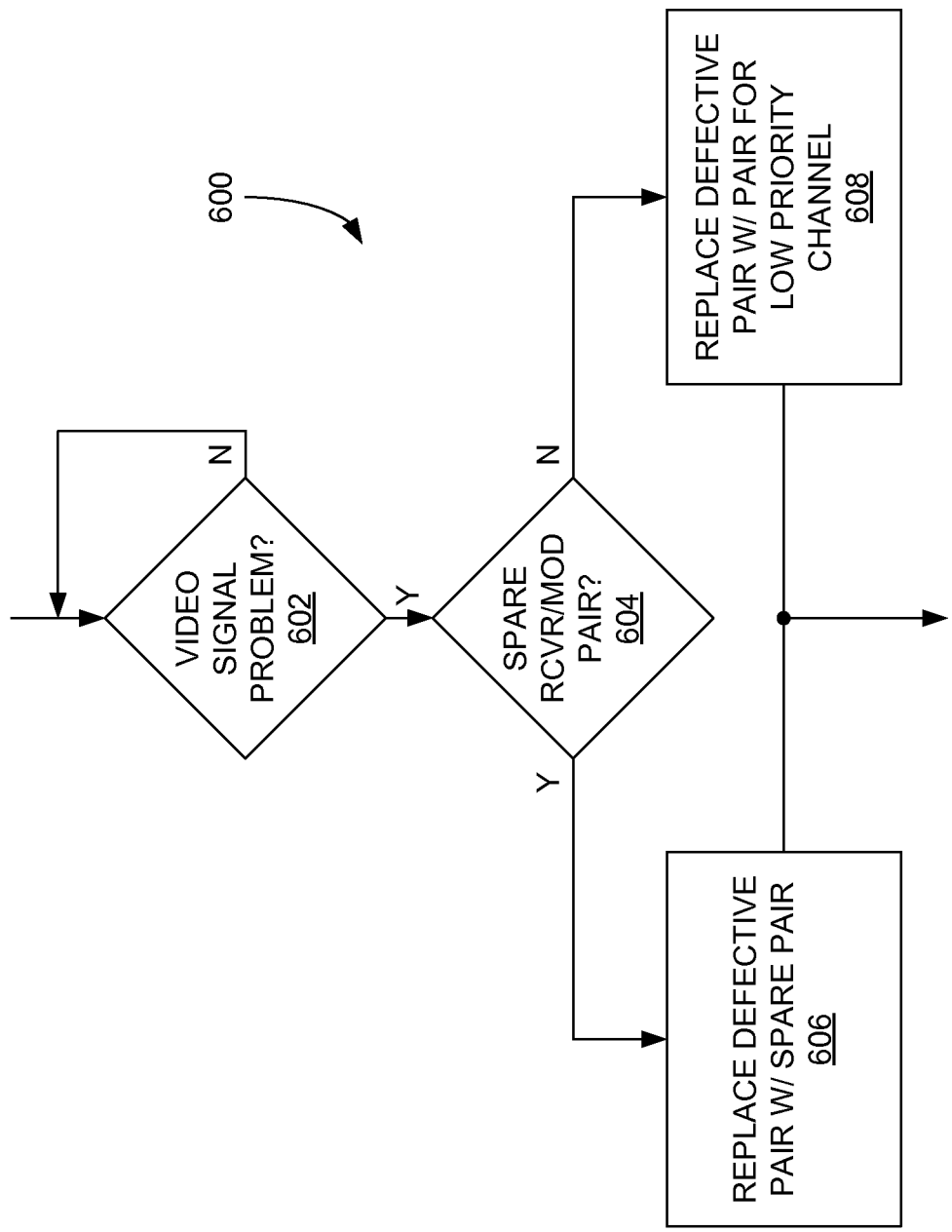
FIG. 6 is a flow diagram of a method of operating a video distribution system according to another embodiment of the invention.

Based on the status received from the various components, the communication node 406 may base the commands it issues on that status. For example, an indication from a receiver 402 or modulator 404 that a video signal is not present at an input or output of the component, or that a particular video signal associated with the component exhibits unacceptable quality, may cause the communication node 406 to replace the affected receiver 402 or modulator 404 with a spare receiver/modulator pair. FIG. 6, described more fully below, provides one example of such a situation. In another scenario, based on statuses indicating relative signal strengths of the modulated video signals 414, the communication node 406 may issue commands altering those strengths to at least some of the modulators 404 to balance the strengths of the modulated signals 414 before the signals 414 are combined at the video combiner 408 into the combined video signal 416. Many other scenarios involving commands based on status received at the node 406 from the various components are also possible in the environment of FIG. 4.

Figure 5:
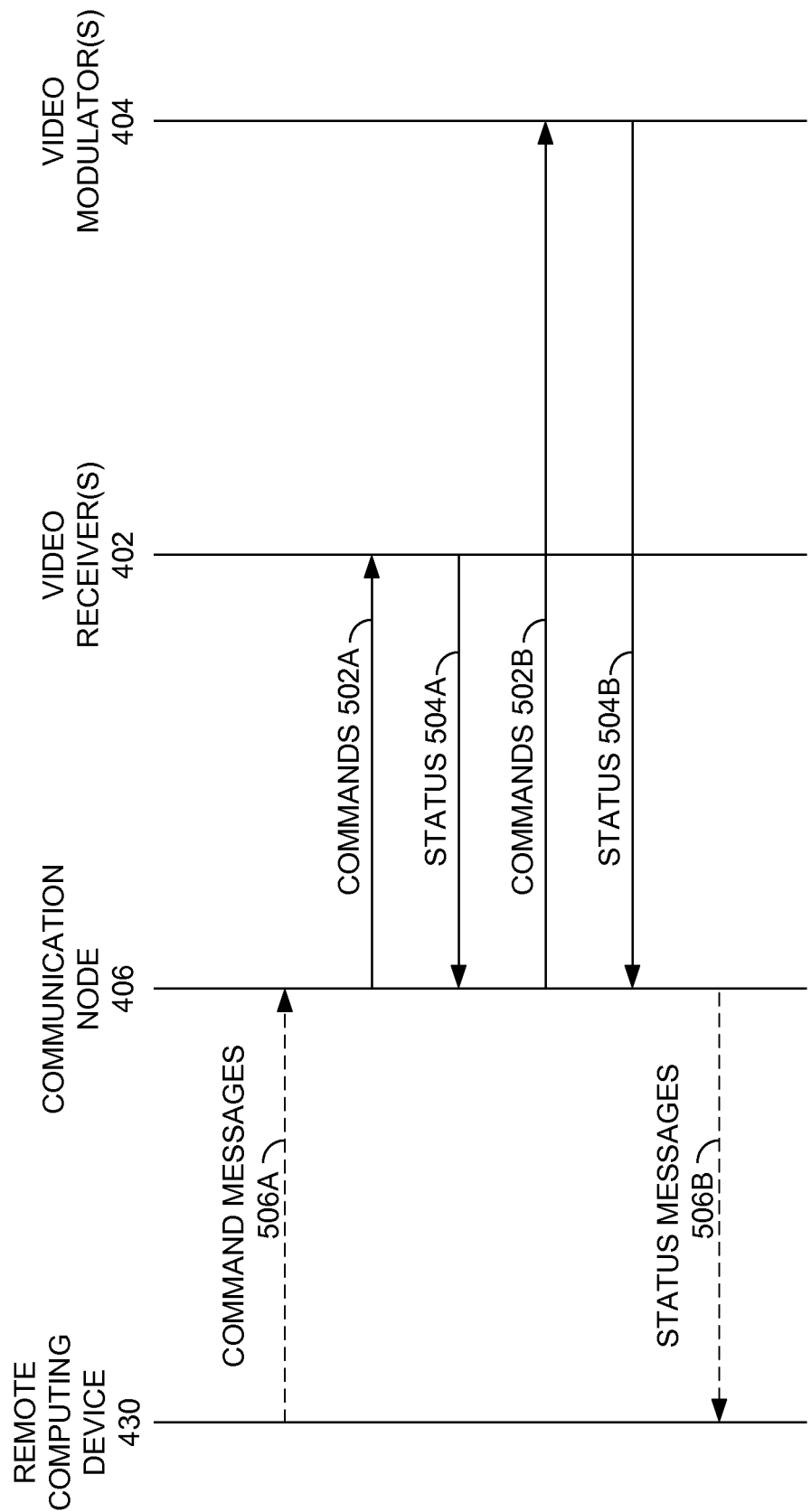
FIG. 5 is a simplified communication diagram regarding the video distribution system of FIG. 4 according to an embodiment of the invention.

FIG. 5 provides a simplified communication diagram illustrating the transfer of commands and status between the communication node 406, the video receivers 402, and the video modulators 406. Generally, the node 406 transfers commands 502A over the communication connection 420 to the various receivers 402, as well as commands 502B to one or more of the video modulators 404. Such commands 502 may include requests for status from those particular components. In the reverse direction, the receivers 402 may transfer status 504A to the communication node 406 over the same connection 420, and the modulators 404 may transfer their status 504B to the node 406. While FIG. 5 may be interpreted as the requiring that the commands 502 and statuses 504 being transferred in the particular order shown, no such order is mandated, as the various commands 502 and statuses 504 may be transferred between the receiver 402 and modulator 404 components and the communication node 406 at any time, depending on the particular application.

Based on the above functionality, the communication node 406, by way of internal control circuitry, such as a microprocessor, microcontroller, or other processing circuitry, may operate autonomously to control the receivers 402, modulators 404, and possibly other components of the video distribution system 400. FIG. 6 provides an example of a method 600 of controlling the system 400 under one scenario. In the method 600, the communication node 406 detects a problem or fault with one of the video signals 410, 412, 414, 416 of the system 400 (operation 602). In one example, the node 406 may detect such a problem by way of the status indications 504 returned from the receivers 402, modulators 404, or combiner 408, as discussed above. If the node 406 detects such a problem, the node 406 may determine whether a spare receiver 402/modulator 404 pair is available in the system 400 (operation 604). In one example, the node 406 maintains a list of which receivers 402 and modulators 404 are currently processing active video signals 410, 412, 414. The node 406 may also be cognizant of which channel 410 each receiver 402 has selected, which modulation frequency each modulator 404 is employing, and so forth.

If a spare receiver 402/modulator 404 pair is available (operation 604), the communication node 406 replaces the pair 402, 404 that is associated with the defective video signal 410, 412, 414, 416 with the spare pair 402, 404 (operation 606). To this end, the communication node 406 may disable the affected pair 402, 404, enable the spare pair 402, 404, configure the spare receiver 402 to select the channel 410 associated with the defective signal 412, 414, and configure the spare modulator 404 to modulate the video signal 412 generated by the spare receiver 402 at the frequency previously employed by the previous modulator 404.

If, instead, no spare receiver 402/modulator 404 pair is available (operation 604), the communication node 406 may then replace the defective pair with an active receiver 402/modulator 404 pair associated with another active video channel 410 (operation 608), thus stopping the distribution of the active video channel 410 in favor of the channel 410 previously carried by the defective pair 402, 404. For example, the active video channel 410 being terminated may be viewed as a "low-priority" channel 410, such as a channel 410 with a relatively low viewership within the community or area being served by the video distribution system 400. Identification of the low-priority channel 410 may be performed by the communication node 406, by a human operator of the system 400, or by some entity external to the system 400.

To allow the video receivers 402, the video modulators 404, the communication node 406, and possibly other components of the video distribution system 400 to communicate with each other via the communication connection 420, the system may employ a protocol allowing each device 402, 404, 406 to automatically announce its communication address, as well as its technical capabilities, to other devices 402, 404, 406 coupled to the connection 420, such as Ethernet, Wi-Fi, or another networking technology. One example of such a protocol is the Universal Plug-and-Play (UPnP) networking protocol, which facilitates formation of peer-to-peer networks of general-purpose and embedded computing devices using a number of networking standards, such as TCP/IP (Transmission Control Protocol/Internet Protocol), UDP (User Datagram Protocol), and others.

As described above, the communication node 406 may be configured to control the various components 402, 404 of the video distribution system 400 in an "automatic" (self-reliant) mode without guidance from exterior devices or operators, thus serving as a controller for the system 400. The method 600 of FIG. 6 is just one example of the kinds of operations possibly performed by the node 600. In lieu of, or in addition to, this automatic mode, the communication node 406, as well as the other components of the system 400, may receive messages, commands, and the like from a remote computing device 430 coupled to the communication node 406 by way of a communication network 425, as shown in FIG. 4.

In one example, the communication network 425 may be a WAN, such as the Internet, although other types of networks, such as LANs, may be employed in other examples. The remote computing device 430 may be any device capable of communicating over the communication network 425, such as a desktop or laptop computer, a mobile communication device, a PDA, or other communication device. In one particular implementation, the communication node 406 serves as a web server from the standpoint of the network 425, and the remote device 430 communicates with the node 406 by way of access to one or more web pages provided by the node 406. Other forms of communication, such as message passing, file transfers, and the like, may be employed to similar effect.

In such a configuration, the remote computing device 430 may control many aspects of the video distribution device 400, such as selection of which of the video channels 410 to select, selection of which modulation frequency to employ for each of the selected video channels 410 for transmission to the community being served over the distribution network, setting of relative signal strengths of the modulated video signals 414, selection of which receivers 402 and modulators 404 to serve as replacements for defective components 402, 404, and other control functions.

Returning to FIG. 5, the remote computing device 430 is depicted as sending one or more command messages 506A, to which the communication node 406 responds by communicating with one or more of the video receivers 402 and video modulators 404 to perform the command or task reflected in the messages 506A. One or more of the command messages 506A may act as a request for the communication node 406 to perform one of the functions listed above, such as channel or modulation frequency selection. In another example, the remote computing device 430 provides configuration data regarding selected video channels 410, modulation frequencies, and the like, in one or more command messages 506A, to which the communication node 406 responds by issuing the necessary commands to the video receivers 402 and video modulators 404 to set the system 400 in the desired configuration.

After reception of one or more command messages 506A, the communication node 406 may then transfer at least one status message 506B to the remote computing device 430, which may indicate the status of the video distribution system 400 in response to the one or more command messages 506. In another implementation, the status messages 506B may indicate a current status of the video distribution system 400, and need not be associated with the commands 502 and status 504 transferred between the communication node 406, the video receivers 402, and the video modulators 404. In another example, one of the command messages 506A is a request for one or more status messages 506. Overall, the command messages 506A and the status messages 506B need not be transferred in time relative to the commands 502 and status 504 involving the node 406, the receivers 402, and the modulators 404 as specifically illustrated in FIG. 5.

At least some embodiments as described herein thus allow a video distribution system including video receivers and video modulators to address several component failure scenarios, either automatically or with the aid of a remote computing device in communication with the system. As a result, a personal visit to the system by a technician or other personnel to repair the system may be avoided, or at least delayed until a more convenient time. Further, periodic changes to various characteristics of the system, such as the alignment of selected video channels to modulation frequencies, or the rebalancing of signal strengths of video modulator outputs, may be performed in a similar fashion, thus reducing the required number of technician or operator in-person visits to the system, thereby reducing system maintenance costs.

While several embodiments of the invention have been discussed herein, other implementations encompassed by the scope of the invention are possible. For example, while various embodiments have been described within the context of a video modulator, other types of signal modulators, such as radio or other audio modulators, may benefit from application of the concepts describe above. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

The invention claimed is:

1. A video modulator, comprising:
   a video input interface configured to receive from a discrete output device a video signal to be modulated;

a video modulation circuit configured to modulate the video signal;

a video output interface configured to transmit the modulated video signal;

a communication interface configured to:
 receive one of first command and a second command via a communication link to control the video modulator,
 communicate a status obtained from at least one of the video input interface, the video modulation circuit, and the video output interface to a communication node that is concurrently controlling a plurality of like video modulators of a network that are each configured to receive the video signal; and control circuitry configured to:
 obtain the status that indicates operating status of at least one of the video input interface, the video modulation circuit, and the video output interface, and
 receive the first command and the second command from the communication interface and to control at least one of the video input interface, the video modulation circuit, and the video output interface based on the received first command and the second command, wherein the second command received from the communication node comprises an indication that the video modulator is to be disabled so that the transmission of the modulated video signal ends, and wherein a selected one of the plurality of other like video modulators is enabled to provide the modulated video signal to an external device that was previously receiving the modulated video signal from the video modulator.

2. The video modulator of claim 1, wherein:
the first command indicates a frequency; and
the video modulation circuit is configured to modulate the video signal at the frequency indicated in the first command.

3. The video modulator of claim 1, wherein:
the first command received prior to the second command,
the first command comprises an indication as to whether transmission of the modulated video signal is to be enabled or disabled; and
the video output interface is configured to control the transmission of the modulated video signal based on the indication.

4. The video modulator of claim 1, wherein:
the first command received prior to the second command,
the first command comprises an indication to alter signal strength of the transmitted video signal; and
the video output interface is configured to alter the signal strength of the transmitted video signal based on the indication.

5. The video modulator of claim 1, wherein:
the first command received prior to the second command,
the first command comprises a request for the status; and
the control circuitry is configured to return the status via the communication interface over the communication link.

6. The video modulator of claim 5, wherein:
the status comprises at least one of an indication as to whether the video signal is present at the video output interface, a current signal quality of the transmitted video signal, an indication as to whether the video signal is present at the video input interface, and a current signal quality of the video signal received at the video input interface.

7. The video modulator of claim 1, wherein:
the video signal comprises a baseband video signal; and
the transmitted video signal comprises a radio frequency video signal.

8. The video modulator of claim 1, wherein:
the communication interface comprises an Ethernet interface.

9. A video modulator, comprising:
a video input interface configured to receive a video signal from a video receiver;
a video modulation circuit configured to modulate the received video signal;
a video output interface configured to transmit the modulated video signal;
a communication interface configured to receive at least one of a first command and a second command from a communication node, wherein the first command and the second command received from the communication node is configured to control operation of the video modulator, and wherein the communication node concurrently controls operation of a plurality of other video modulators; and
control circuitry configured to control operation of at least one of the video input interface, the video modulation circuit, and the video output interface based on the received first command and the second command,
wherein the control circuitry is configured to receive status data from one of the video input interface, the video modulation circuit, and the video output interface of the video modulator,
wherein the status data indicates operating status of the video input interface, the video modulation circuit, and the video output interface,
wherein the control circuitry is further configured to communicate a signal to the communication node in response to the status data indicating failure of at least one of the video input interface, the video modulation circuit, and the video output interface of the video modulator,
wherein the second command received from the communication node comprises an indication that the video modulator is to be disabled so that the transmission of the modulated video signal ends, and
wherein a selected one of the plurality of other video modulators is enabled to provide the modulated video signal to an external device that was previously receiving the modulated video signal from the video modulator.

10. The video modulator of claim 9, wherein the first command is received prior to the second command, and wherein the first command received from the communication node indicates a frequency, and wherein the video modulation circuit modulates the video signal at the indicated frequency.

11. The video modulator of claim 9, wherein the first command is received prior to the second command, and wherein the first command received from the communication node comprises an indication that the modulated video signal is to be enabled at the video modulator, wherein the first command that the modulated video signal is to be enabled is received in response to a failure in operation of at least one of the plurality of other video modulators, and wherein the modulated video signal from the video modulator is transmitted to an external device that was previously receiving another modulated video signal from the failed one of the plurality of other video modulators.

12. The video modulator of claim 9:
wherein the control circuitry is configured to obtain status data from at least one of the video input interface, the video modulation circuit, and the video output interface, wherein the first command received from the communication node comprises a request for the status, and wherein the control circuitry is configured to return the status data to the communication node.

13. The video modulator of claim 12 wherein the status data comprises at least one of an indication as to whether the video signal is present at the video output interface, a current signal quality of the transmitted video signal, an indication as to whether the video signal is present at the video input interface, and a current signal quality of the video signal received at the video input interface.

14. A method of controlling operation of a video modulator, wherein the video modulator is one of a plurality of video modulators controlled by a communication node, comprising:

receiving a video signal at a video input interface of the video modulator, wherein the video signal is received from a video receiver that is communicatively coupled to the video modulator;

modulating the received video signal at a video modulation circuit of the video modulator;

transmitting the modulated video signal from a video output interface of the video modulator;

receiving at least one of a disable command and a command from the communication node at a communication interface of the video modulator, wherein the command from the communication node is configured to control operation of the video modulator, and wherein the disable command is configured to end operation of the video modulator; and controlling operation of at least one of the video input interface, the video modulation circuit, and the video output interface of the video modulator based on the command received from the communication node, wherein the operation is controlled by control circuitry of the communication node based on the received command, wherein during operation of the video modulator, the method further comprising:

receiving at the control circuitry status data from one of the video input interface, the video modulation circuit, and the video output interface of the video modulator, wherein the status data indicates operating status of the video input interface, the video modulation circuit, and the video output interface;

communicating a signal generated by the control circuitry to the communication node in response to the status data indicating failure of at least one of the video input interface, the video modulation circuit, and the video output interface of the video modulator; and receiving the disable command from the communication node, wherein the disable command received from the communication node is received in response to enablement of at least one of the plurality of other video modulators which provides the modulated video signal to a device that was previously receiving the modulated video signal from the video modulator.

15. The method of claim 14, wherein the command is received prior to the disable command, and wherein the command received from the communication node comprises an indication that the modulated video signal is to be enabled at the video modulator, wherein the command that the modulated video signal is to be enabled is received in response to a failure in operation of one of the plurality of video modulators, and further comprising:

transmitting the modulated video signal to a device that was previously receiving the modulated video signal from the failed one of the plurality of video modulators.

16. The method of claim 14, wherein the command is received prior to the disable command, and wherein the command received from the communication node comprises an indication to alter signal strength of the transmitted video signal, and further comprising:

altering the signal strength of the transmitted video signal based on the indication.

17. The method of claim 14, wherein the control circuitry is configured to obtain a status from at least one of the video input interface, the video modulation circuit, and the video output interface;

receiving a status request command from the communication node corresponding to a request for the status of the video modulator; and returning the status of the video modulator to the communication node in response to receiving the status request.

18. The method of claim 17, wherein the status comprises at least one of an indication as to whether the video signal is present at the video output interface, a current signal quality of the transmitted video signal, an indication as to whether the video signal is present at the video input interface, and a current signal quality of the video signal received at the video input interface.

* * * * *